United States Patent [19]

Heidrich

[11] 4,315,746

[45] Feb. 16, 1982

[54] HORIZONTAL BEAM WIDTH INTEGRATOR

[75] Inventor: Arthur J. Heidrich, South Daytona, Fla.

[73] Assignee: General Electric Company, Syracuse, N.Y.

[21] Appl. No.: 155,310

[22] Filed: Jun. 2, 1980

[51] Int. Cl.³ ............................................. G09B 9/00
[52] U.S. Cl. ................................ 434/2; 235/92 NT; 235/92 SH; 343/5 DP; 364/724
[58] Field of Search ............ 434/2; 343/5 DP, 5 VQ; 235/92 NT, 92 SH; 364/581, 724, 728

[56] References Cited

U.S. PATENT DOCUMENTS

| | | | |
|---|---|---|---|
| 2,934,835 | 5/1960 | Cutler | 434/2 |
| 3,623,089 | 11/1971 | Bossert | 343/5 DP |
| 3,634,886 | 1/1972 | Synowka | 434/2 X |
| 3,787,855 | 1/1974 | Cragon et al. | 343/5 DP X |
| 3,868,685 | 2/1975 | Wilmot | 343/5 VQ X |
| 4,008,476 | 2/1977 | Evans, Jr. | 343/17.7 |
| 4,017,985 | 4/1977 | Heartz | 434/2 |
| 4,117,538 | 9/1978 | Shrader et al. | 343/5 VQ X |
| 4,161,030 | 7/1979 | de Jong | 364/581 |
| 4,224,620 | 9/1980 | Seiersen | 343/5 VQ |

Primary Examiner—T. H. Tubbesing

Attorney, Agent, or Firm—Carl W. Baker; Richard V. Lang

[57] ABSTRACT

A beam width integrator is provided for a radar simulation system in which a synthetic radar image is generated from echoes comprised of simulated echo contributions. The amount of special-purpose digital equipment required is significantly reduced, together with the overall cost and complexity of the equipment. Data signals which jointly represent an echo contribution are provided in logarithmic form in order to limit the required storage and other logic and to reduce the number of operations required to process the signals. The echo contributions are divided into successive groups, each group comprising a predetermined number of echo contributions lumped to constitute a single set of equivalent signals. A complete echo is represented in uncorrected form by a predetermined number of successive groups. By numeric addition, an average weighting signal is applied to each group of lumped echo contributions to correct for gain profile-originated echo intensity variations. The corrected signals are successively paired in an adder tree comprising a plurality of power adders, each performing a numeric addition of a pair of logarithmic input signals. The output of the adder tree comprises a plurality of beam width integrated data signals which are jointly representative of a true echo.

26 Claims, 5 Drawing Figures

HORIZONTAL BEAM WIDTH INTEGRATOR

The present invention relates in general to a system for providing a synthetic radar image, in particular to a beam width integrator for use in equipment which stimulates radar echoes that are produced when a radar beam scans a predetermined azimuth angle.

BACKGROUND OF THE INVENTION

The cost of operating airborne radar equipment in its normal operating environment dictates that training in the operation of such equipment be carried on in large measure by means of simulation. In a simulation system the display viewed by the user of the equipment responds to signals that are originally provided from external storage. For example, the display may simulate the echoes reflected when a particular azimuth angle, e.g. 360 degrees, is periodically scanned by the radar beam. In such a system the externally stored signals from which the display is generated may simulate the intensities of the echoes reflected by the actual terrain when scanned by the beam.

Early simulation equipment for this purpose relied on analog techniques to produce the image on the display screen. Such images often lacked proper focus and thus they were unclear and objectionable as far as the user was concerned. The advantages of using digital techniques which provide a clearer image on the dispaly have long been recognized. However, a relatively large amount of digital circuitry is required to implement these techniques if a direct approach is taken. In particular, where approximations are made in the prior art to limit the quantity of the required equipment and hence its cost and complexity, the resultant image is often found to lack sufficient dynamic range to provide the requisite realism of the target or terrain simulated on the screen.

OBJECTS OF THE INVENTION

It is a primary object of the present invention to provide a digital radar simulation system in which the foregoing disadvantages are overcome.

It is another object of the present invention to provide a horizontal beam width integrator for a digital radar simulation system which requires significantly less special purpose equipment than heretofore available integrators of this type, yet one which provides sufficient dynamic range to produce a realistic display of the simulated image.

It is a further object of the present invention to provide a horizontal beam width integrator for a digital radar simulation system which is simpler in construction and less expensive to build than heretofore available integrators of this type.

DESCRIPTION OF THE INVENTION

The present invention is directed to the simulation of an airborne horizontal radar or the like, wherein the radar beam executes radial sweeps out to maximum beam range at a predetermined pulse repetition frequency while periodically scanning throgh an azimuth angle at a predetermined scan rate. Echoes are produced at the pulse repetition frequency, i.e. at the sweep frequency, by the successive radial sweeps of the radar beam while traversing the aforesaid azimuth angle. Thus, successive sweeps of the beam illuminate successive, partially overlapping areas of the azimuth angle. The latter angle may be 360 degrees, although smaller angles are possible. A synthetic radar image of the horizontal space defined by the azimuth angle is created by generating radar target echoes from externally provided data, which simulate the actual echoes produced.

When a common used type of radar antenna is employed, the configuration of the radar beam is such that each of the aforesaid areas approximates the shape of a sector, defined substantially by the beam width and by the maximum beam range. Each sector may be thought of as consisting of $N_S$ segments or subsectors, which are defined by the scan angle advance that occurs between successive sweeps as the beam traverses a given sector. If the entire azimuth angle is considered as being divided into subsectors, it will be clear that the particular sector illuminated by the scanning (rotating) beam will contain a different mix of $N_S$ subsectors during each sweep. Alternatively, if a fixed sector of the azimuth angle is considered, each of $N_S$ sweeps will illuminate a different number of subsectors belonging to such fixed sector, as the beam continues to rotate. Each of the $N_S$ subsectors of any sector illuminated by the beam, provides a contribution to the total echo from that sector. Hence, $N_S$ echo contributions must be simulated in order to simulate the complete echo of such sector.

In practice, the radar beam has a characteristic beam gain across the beam width, which depends on the nature of the radar employed. Normally, the gain is highest at the center of the beam, i.e. at the sweep line, and lowest at the beam edges. As the beam traverses a particular sector, i.e. as it scans across it, the intensity of the echo contribution provided by each sweep will vary as a function, respectively, of the gain profile and of the position of the sweep line relative to the sector during that sweep. Assuming a symmetrical beam gain profile as described above, the intensity of the echo contribution provided by a particular subsector will be low when the leading edge of the rotating beam first reaches this subsector. The echo intensity will rise during subsequent sweeps as the beam advances across the subsector, until a maximum value is reached when it is centered over the subsector. Further sweeps will produce successively lower echo intensities, until the trailing beam edge has completely passed over subsector.

Each sector, and hence each subsector, may be viewed as containing $N_R$ discrete, radial beam range zones between the radar antenna and maximum beam range. These range zones are swept in succession out to maximum beam range by each sweep of the beam. Thus, with a sector angularly divided into $N_S$ subsectors and radially divided into $N_R$ range zones, each subsector may be considered as consisting of $N_R$ range cells. Depending on the target or the terrain features, each cell reflects the radar beam at its own characteristic echo intensity. In accordance with the present invention, each echo intensity is simulated in external storage as a separately calculated information value in the form of a multi-digit data word. Hence, an echo contribution is simulated by a set of $N_R$ data words or data signals, each of which must be multiplied by a weight factor to correct for gain profile-originated echo intensity variations. Subsequently, by a process of beam width integration, the respective echo contributions must be combined to provide a simulated sector echo for each sweep consisting of a single set of $N_R$ discrete data signals. This last-mentioned set of data signals simulates the echo of the sector on which the beam is centered during that sweep and it is used to produce the image of that sector on the display.

It will be clear from the foregoing discussion that a large number of calculations is required to provide each simulated, gain profile-corrected, beam width integrated echo signal. Depending on the radar to be simulated and the characteristic beam width, $N_S \geq 100$, i.e. upward of 100 echo contributions must be corrected and combined to obtain the output signal for a single echo. These contributions must be stored for a time interval equivalent to the duration of $N_S$ sweeps. $N_S \times N_R$ multiplications are required to assign the proper weight to each echo intensity value of a single sector. Since each echo contribution may consist of several thousand data signals, the number of required multiplications is substantial. Further, if each data word is assumed to have $N_W$ digits, the required storage capacity is $(N_R \times N_S \times N_W)$ bits.

In order to minimize the amount of hardware required, the above-described calculations are carried out in the logarithmic domain in accordance with the present invention. The data signals, each representative of the data intensity of a single cell, are provided in logarithmic form. Instead of multiplying each echo intensity by a weighting factor, a weighting signal in logarithmic form is added to each logarithmic echo intensity value to provide a digital signal representative of the logarithm of the weighted or true echo intensity. This reduces the complexity and the number of calculations required.

The $N_S \times N_R$ weighted echo intensity values in logarithmic form, which jointly represent the total number of echo contributions of a single sector echo, must subsequently be combined to obtain an integrated beam width signal of the sector echo. To do so, a numeric summation of these values, by pairs, is required. However, the transformation from logarithmic to numeric form will convert a small digital word to a large word. Hence, a different approach is called for in order to avoid the use of large amounts of hardware, which would negate the hardware saving effected in the first place by operating in the logarithmic domain.

For example, the dynamic range of the weighted echo intensities may be typically 80 dB, i.e. $1 \times 10^8$. If the least significant bit in the digital representation of these values is selected to represent 0.5 dB, an 8 bit word will be sufficient to describe any echo intensity in the aforesaid dynamic range in logarithmic form. However, in the numeric domain a digital word of 27 bits would be required. Since the summation process by which beam width integration is carried out is performed on a pair-by-pair basis, a total of $N_S - 1$ adders is required. Under the above conditions, these adders would have to accommodate 27 bits each, plus an extra bit to prevent any overflow of the adder tree. Clearly, this represents a very large investment is special purpose digital hardware. Moreover, at the required processing rates the use of microprocessors is ruled out and hence no cost savings are possible from such an approach.

In the prior art, any reduction in the amount of equipment utilized was frequently achieved at the expense of the number of echo contributions used to represent an echo for simulation purposes and/or by a reduction of the number of discrete beam range cells for which separate signals were provided. Either or both measures resulted in a significant decrease in the realism of the image displayed on the user's screen. In the present invention a technique is employed which permits the processing of signals in grouped or lumped form. The resultant reduction of the amount of equipment required is obtained without a significant decrease in the realism of the displayed image.

Figure 1:
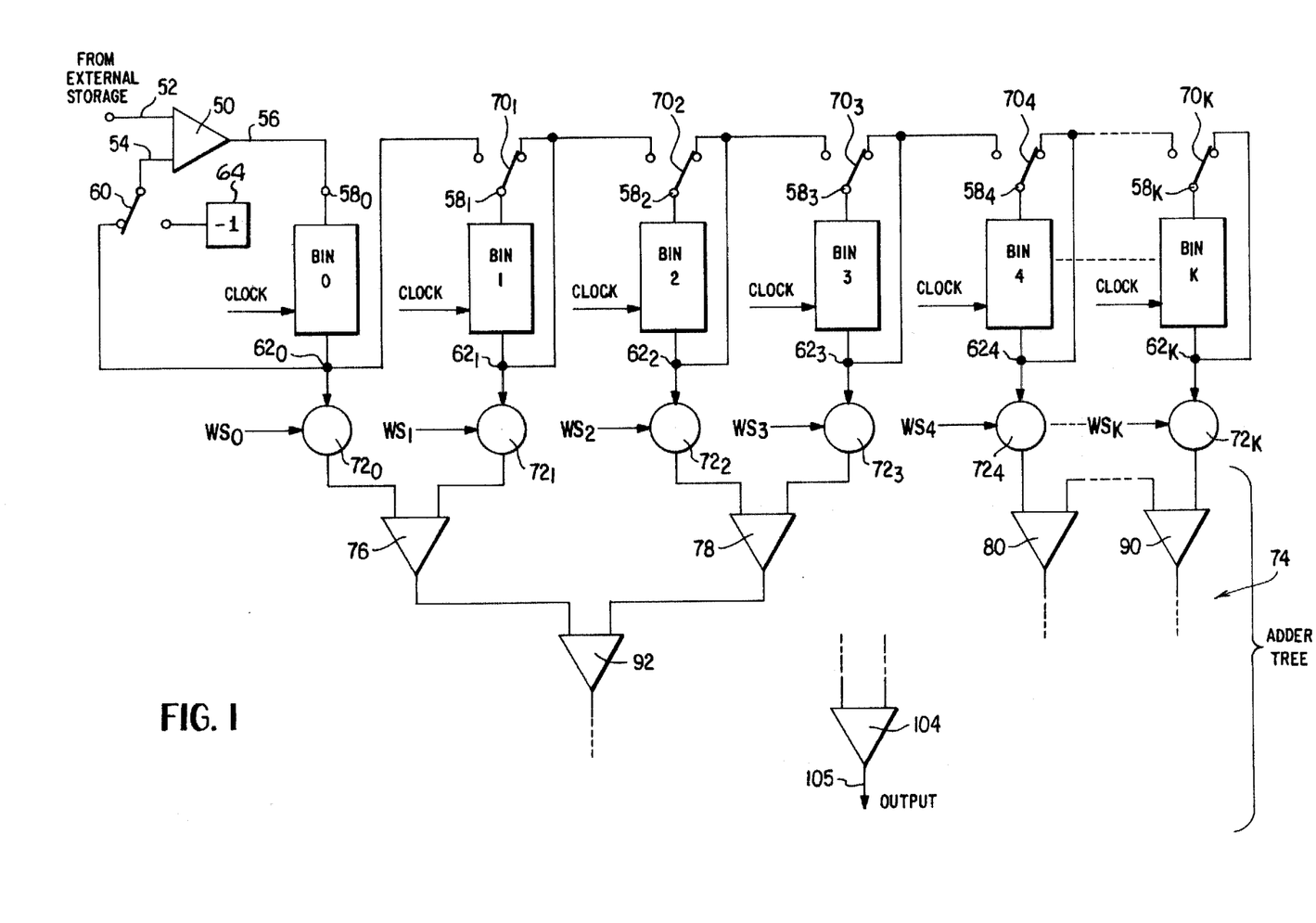
FIG. 1 illustrates in schematic form a preferred embodiment of a horizontal beam width integrator in accordance with the present invention.

With reference now to the drawings, FIG. 1 illustrates a power adder 50 which has a pair of inputs 52 and 54 and an output 56. In response to logarithmic input signals applied to inputs 52 and 54, a responsive output signal is provided on output 56 which represents the logarithm of the numeric sum of the signals supplied to inputs 52 and 54. In accordance with the present invention, input 52 receives the above-described data signals from external storage, each consisting of a multi-digit signal representing the logarithmic value of an echo intensity. These signals may, for example, be provided from a stored data base by way of a front end processor.

Output 56 of power adder 50 is connected to input $58_0$ of the first bin in a sequence of substantially identical storage bins. The first bin in the sequence has been designated bin 0, the remaining bins being numbered in ascending order, i.e. bins 1 through K. In a preferred embodiment of the invention K = 15, and hence the total number of bins, $N_B$, in the sequence is 16. However, it will be understood that the invention is not so limited. Each bin preferably takes the form of a shift register, e.g. configured from RAM chips commercially available from Intel Corp. under the designation 2147-3. Other types of storage may also be employed. Each bin has a storage capacity of $N_R \times N_W$ bits to accommodate the full number of data signals required to describe a single echo contribution.

Input 54 of power adder 50 is connected to switch means 60. Although, for the sake of simplicity, switch means 60 is represented in FIG. 1 as a mechanical switch with two settings, it will be understood that it is preferably implemented as a gate or the like. With the setting shown in FIG. 1, power adder input 54 is connected to output $62_0$ of bin 0 to form an accumulator circuit. In the other setting of switch means 60, input 54 is connected to a source 64, which applies a logarithmic signal substantially equivalent to a numeric 0.

The remaining bins of the sequence, i.e. bins 1, 2, ... K, are connected in substantially identical manner to each other. These bins each have one input, i.e. $58_1$, $58_2$, ... $58_K$; and one output, i.e. $62_1$, $62_2$, ... $62_K$. Each of bins 1, 2. . . K also has a separate switch means associated therewith, designated $70_1$, $70_2$, ... $70_K$, each connected to a corresponding bin input $58_1$, $58_2$, ... $58_K$ respectively. Although shown as a mechanical switch for the sake of simplicity, each of switch means 70 is preferably implemented as a gate or similar circuit having two settings. In the switch setting illustrated in FIG. 1, each bin output $62_1, 62_2, \ldots 62_K$ is connected back to input $58_1, 58_2, \ldots 58_K$ respectively, of the same bin. In the other setting of switch means 70, each bin is connected to the preceding bin in the sequence. Specifically, in the latter setting of switch means 70, bin input $58_1$ is connected to output $62_0$ of bin 0. Similarly, bin input $58_2$ is connected to bin output $62_1$, and so forth.

In an exemplary embodiment of the invention, $N_W=8$, i.e. an 8 bit word is used to represent the logarithm of each echo intensity. If $N_R=4000$, each bin must be capable of storing 4000 bytes, i.e. 4000 8 bit words. Where the respective bins comprise shift registers, the data signals, i.e. the 8 bit words in a particular bin, are shifted stepwise between input 58 and output 62. Such shifting of each word requires $N_R$ clock pulses, applied as shown schematically in FIG. 1. With the illustrated setting of switch means 70, the contents of bins 1, 2. . . K are thus adapted to be recirculated completely upon each occurrence of $N_R$ clock pulses. In the other setting of switch means 70, each bin is connected to receive the contents of the preceding bin of the sequence in $N_R$ clock pulses.

The circuit of FIG. 1 further includes a set of numeric adders $72_0, 72_2, \ldots 72_K$, each having one of a pair of inputs connected to bin outputs $62_0, 62_1, 62_2, \ldots 62_K$, respectively. In a preferred implementation of the invention, each numeric adder 72 may be configured from a pair of parallel-connected bit adder chips available from Texas Instrument Co. under the designation SN 74S283. Separate weighting signals $WS_0, WS_1, WS_2 \ldots WS_K$ are applied to the other inputs of numeric adders $72_0, 72_1, 72_2 \ldots 72_K$ respectively, each adapted to correct for gain profile-originated variations of the signals received from the connected bin.

Figure 2:
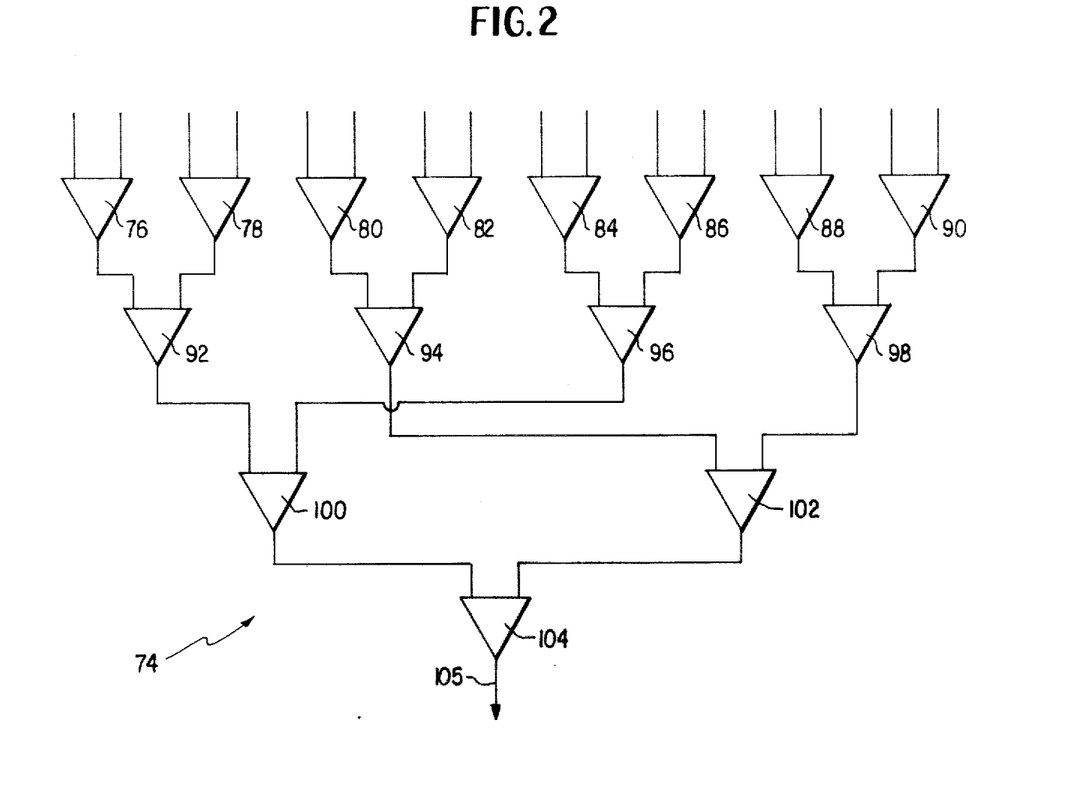
FIG. 2 illustrates a portion of the circuit of FIG. 1 in greater detail.

An adder tree 74 is connected to the outputs of numeric adders 72 and consists of a plurality of power adders, each substantially identical to power adder 50. The power adders of circuit 74 are arranged in successive levels of decreasing numbers of units, terminating in a single power adder 104 which has an output 105. A preferred embodiment of the adder tree is best illustrated in FIG. 2 and is seen to contain four levels of power adders. For the purpose of the present discussion it is assumed that $N_B=16$, i.e. the bin sequence contains 16 shift registers. The power adders of the first level of the adder tree are designated 76, 78, 80, 82, 84, 86, 88 and 90, each having a pair of inputs connected to a pair of numeric adders 72. Thus, unit 76 is connected to the outputs of numeric adders $72_0$ and $72_1$. Similarly, unit 78 is connected to the outputs of numeric adders $72_2$ and $72_3$. The remaining power adders of the first level are similarly connected, up to and including unit 90 which is connected to the outputs of the 15th and 16th numeric adders.

The outputs of power adders 76–90 are paired, each pair being connected to a power adder in the second level of the adder tree, comprising units 92, 94, 96 and 98. Thus, unit 92 is connected to the outputs of power adders 76 and 78; unit 94 is connected to the outputs of units 80 and 82; unit 96 is connected to the outputs of units 84 and 86; and unit 98 is connected to the outputs of units 88 and 90.

Units 92 and 96 are paired and connected to the inputs of a power adder 100 in the third level of the adder tree. Likewise, units 94 and 98 are paired and connected to the inputs of unit 102 in the third level. The final level of the adder tree contains the aforesaid single power adder 104, which receives its input signals from units 100 and 102. Unit 104 provides beam width integrated signals on output 105, representative of a complete echo.

Each of the power adders discussed above, i.e. unit 50 and units 76–104, performs a summing function whereby an output signal is obtained which represents the logarithm of the numeric sum of a pair of input signals, each of the latter representing the logarithm of a value. This is illustrated in schematic form with reference to FIG. 3 wherein a pair of logarithmic input signals, designated C and D respectively, is applied to a unit 106. A comparing and selection function is performed by unit 106 to identify and select the larger and smaller one respectively, of the signals applied to the inputs of unit 106. Both the larger and the smaller signal, designated A and B respectively in FIG. 3, appear at separate outputs of unit 106 and they are so applied to a subtraction unit 108.

In unit 108, the smaller signal B is subtracted from the larger signal a to provide a difference signal, designated $\Delta$. This difference signal is applied to a table lockup unit 110 and a responsive correction signal TO is provided at the output thereof. Signal TO is applied to one input of a numeric summing unit 112. A further input of unit 112 is coupled to the output of a delay buffer unit 114, whose input, in turn, is connected to receive signal A. Buffer unit 114 delays signal A by an interval sufficient to apply it to summing unit 112 in phase with signal TO. The effect of the latter signal is to correct for the difference in the results between the desired numeric addition of the numbers represented by signals C and D and the numeric addition of the logarithm of these numbers, as carried out in the circuit of FIG. 3. The logarithm of the numeric sum of signals C and D is provided at the output of summer 112.

Figure 3:
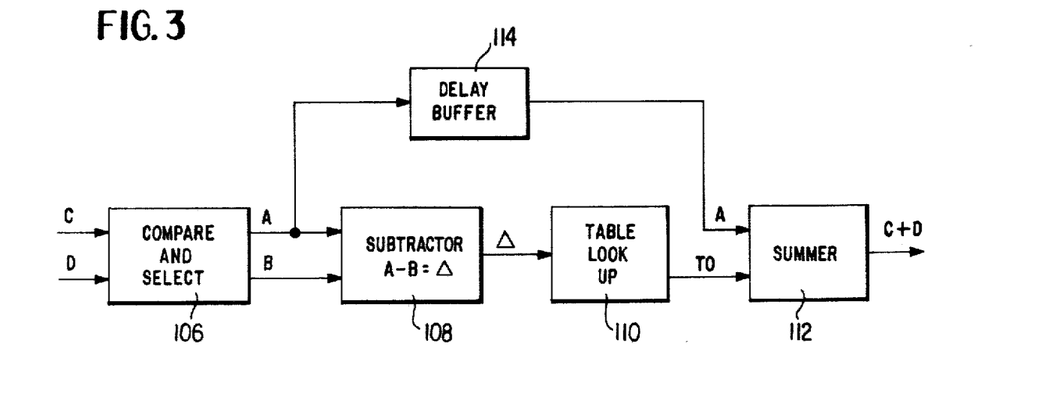
FIG. 3 illustrates a preferred power adder used in the circuits of FIGS. 1 and 2.

In a preferred embodiment of the invention, each of signals C and D constitutes an 8 bit word representative of the logarithm of a numeric value. Upon subtraction of the smaller from the larger signal, the difference signal is arbitrarily limited to a 5 bit word in unit 108. The limiting process assures that $\Delta$ is never greater than the number 31. This arbitrarily chosen limitation represents a tradeoff between accuracy, i.e. the realism of the displayed image, and the required amount of logic and memory hardware.

Figure 4:
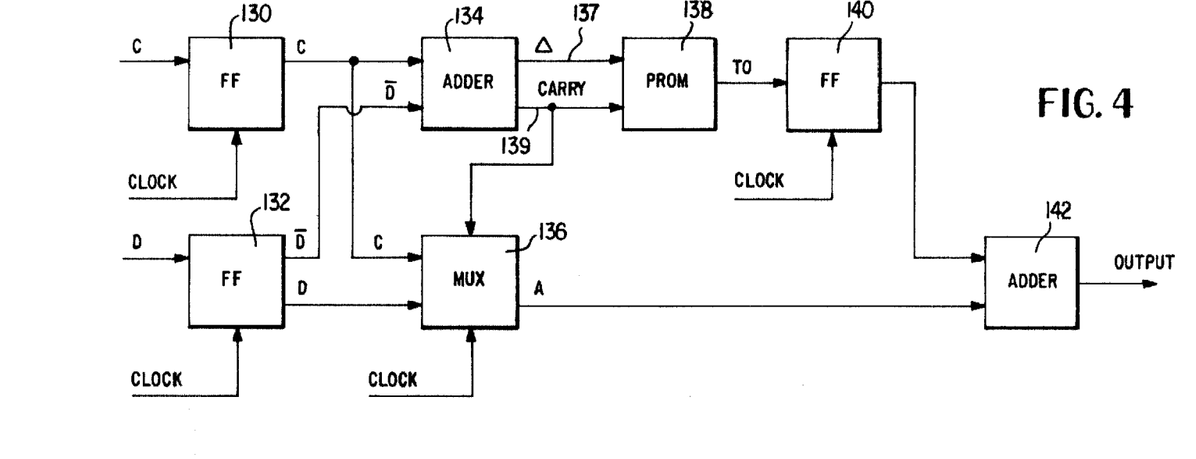
FIG. 4 illustrates a preferred implementation of the power adder shown in FIG. 3.

FIG. 4 illustrates a preferred implementation of the power adder shown schematically in FIG. 3. Signal C is applied to a chip 130 containing a single D-type flip flop. The chip may be of the type that is commercially available from Texas Instrument Co. under the designation SN74S374. Signal D is applied to a chip 132, available from T.I. under the designation SN74S175, which contains a pair of D-type flip flops to provide signal D as well as its complement $\overline{D}$ at the output. These flip flops are triggered by suitable clock pulses, designated CLOCK in thd drawing. Signal $\overline{D}$ is applied to an adder unit 134, which may be configured from a pair of adder chips that are commercially available from Texas Instrument Co. under the designation SN74S283. Adder unit 134 further receives at its input the output signal C of flip flop 130. The latter signal is also applied to a clocked multiplexer unit 136 which further receives output signal D of flip flop 132 at its input. Unit 136 may comprise a pair of quad 2-input storage multiplexers, available from Texas Instrument Co. under the designation SN74S398.

One of the outputs of adder 134, designated 137 in FIG. 4, effectively provides the aforesaid difference signal Δ, which consists of an 5 bit signal in the preferred embodiment of the invention. A second adder output 139 provides a 1 bit Carry signal which is applied to clocked multiplexer unit 136. Signal Δ and the Carry signal are both applied to a programmable read only memory 138 which preferably comprises a unit that is available under the designation 110TLU. If signal Δ is positive, one half of PROM 138 is read; if negative, the other half is read. In either case, the output signal TO provides the aforesaid correction factor.

Signal TO is applied to a clocked flip flop unit 140 which may include one or more flip flops to compensate for delays throughout the remainder of the circuit. The output of flip flop unit 140 is applied to an adder unit 142 which may be configured in similar manner to unit 134. The multiplexers of unit 136 effectively constitute the delay buffer of FIG. 3. Depending on the Carry signal, one or the other of the inputs applied to unit 136 will become the delayed output signal A. The latter signal corresponds to the identically designated signal in FIG. 3 and is applied to a further input of adder unit 142. The logarithm of the numeric sum of signals C and D is provided at the output of unit 142.

As previously explained, the sector-shaped space illuminated by the radar beam during each sweep is divided into $N_S$ segments or subsectors, which themselves consist of $N_R$ cells each. The echo intensities of the respective cells, which are simulated by externally stored data signals, must be weighted to correct for gain profile-originated variations and then combined numerically to form the beam width integrated signals which represent each sweep of the beam. The image of the sector illuminated by each sweep is generated from the beam width integrated signals.

As discussed above, the use of logarithmic values permits the weighting function to be performed by addition in numeric adders rather than by multiplication. Likewise, the beam width integration function carried out by adder tree 74 is performed in the logarithmic domain, as already mentioned. In accordance with the present invention, a further reduction is effected in the amount of equipment that would otherwise be required, by lumping successive echo contributions in groups of $N_L$ contributions each and applying a separate, externally provided, average weighting factor of constant value to each group. In an exemplary embodiment of the invention $N_L = 10$, i.e. each group contains $N_L$ lumped echo contributions. While $N_L$ may be larger or smaller than 10, reasonable accuracy and realism in the simulated image requires that the number of echo contributions lumped together not be overly large.

The lumping of $N_L$ echo contributions is accomplished by the accumulator circuit which is formed when switch means 60 is in the position shown in FIG. 1. Successive data signals, each representing the logarithm of the echo intensity of a cell, are applied from external storage to input 52 of power adder 50. The output signal of this power adder is loaded into bin 0 by way of input $58_0$. While in practice data signals are applied in continuous succession to power adder 52, the operation nevertheless comprises periodically repeating cycles where the cycle period is a selected multiple of the period of the beam sweeps.

For purposes of the explanation herein, an arbitrarily selected point in time is designated as the start of the operation, as well as the start of a cycle. At this point in time, switch means 60 assumes a setting which connects power adder input 54 to source 64. As explained above, source 64 provides the logarithmic equivalent of a zero signal to input 54 of power adder 50. The concurrent application of the following set of $N_R$ clock pulses is effective to load the first echo contribution into bin 0 in the form of $N_R$ data signals. This occurs from external storage by way of input 52, power adder 50 and bin input $58_0$. These signals replace the previous contents of bin 0, if any, by the shift register action of the bin.

The time interval defined by the $N_R$ clock pulses during which the foregoing action takes place constitutes a fixed portion of each cycle, which is arbitrarily designated as the second time interval. Upon completion of this time interval, switch means 60 changes to the setting shown in FIG. 1. This action establishes the aforesaid accumulator circuit and initiates a first time interval as part of the cycle.

During the application of the second set of $N_R$ clock pulses, the data signals representative of the second echo contribution are loaded into bin 0 by way of power adder 50 and bin input $58_0$. Concurrently, the data signals of the first echo contribution appear in clock pulse synchronism at bin output $62_0$, when they are fed back to power adder 50 by way of switch means 60 and input 54. Thus, the first 8 bit word, or data signal, of the stored echo contribution is applied to power adder 50 simultaneously with the first 8 bit data signal of the second echo contribution. These two data signals represent the logarithm of the echo intensity of the first cell in each of two adjacent subsectors. It will be clear that these cells are located in a common range zone, i.e. they are at the same beam range in the two adjacent subsectors.

By the process described in connection with FIG. 3, the two data signals are added by power adder 50 and their numeric sum is loaded into bin 0. The process repeats for each set of $N_R$ data signals of the first and second echo contributions. After the last data signal of the second echo contribution has been loaded into bin 0, the latter again contains $N_R$ data signals, representing, however, the lumped sum of the first and second echo contributions.

Upon the application of the third set of $N_R$ clock pulses, the signals appearing at bin output $62_0$, which now represent the sum of the first and second echo contributions, are applied to power adder input 54 in synchronism with the data signals representative of the third echo contribution received from external storage. The accumulation process now causes the lumped sum of the first, second and third echo contributions to be stored in bin 0 during the current set of $N_R$ clock pulses, to be available later at bin output $62_0$ upon the application of a fourth set of $N_R$ clock pulses.

It will be recalled that the current first time interval was initiated with the second set of $N_R$ clock pulses. Assuming $N_L = 10$, the first time interval will terminate with the application to power adder input 52, of the last data signal of the tenth echo. Thus, the duration of the first time interval is $(N_L - 1)N_R$ clock pulses and its length determines the number of echo contributions that are lumped together in bin 0. At the conclusion of the current first time interval, which also terminates the cycle, bin 0 will contain $N_L$ lumped echo contributions which correspond to the first $N_L$ subsectors of the sector then scanned by the beam. Switch means 60 again changes to its other setting, in which source 64 is connected to power adder input 54. Thus, a second time interval initiates the next cycle, in identical manner to the previous cycle. Since the loading of each set of $N_R$ data signals represents one sweep, it will be seen that the period of the cycle is a selected multiple of the sweep period, which is the inverse of the radar beam pulse repetition frequency. In the present example, the multiple is $N_L$.

During the first time interval of the previous cycle, switch means $70_0$, $70_1$, $70_2$, ... $70_K$ were each in the setting shown in FIG. 1, in which each bin output 62 was connected to input 58 of the same bin. Upon the initiation of the current cycle, each of switch means 60 and 70 changes to its other setting. The new setting of switch means 60 terminates the accumulation function and starts the loading of the first echo contribution of a second group of $N_L$ echo contributions into bin 0. Simultaneously, input $58_1$ of bin 1 is now connected to output $62_0$ of bin 0. Similarly, the inputs of bins 2, 3, 4 ... K are now connected to the outputs of bins 1, 2, 3 ... K−1, respectively. Thus, each storage bin of the sequence is coupled to its preceding bin during the second time interval which initiates the current cycle. As a consequence, the contents of bin 0, i.e. the first group of $N_L$ lumped echo contributions, is loaded into bin 1 during the second time interval. Likewise, the contents, if any, of bins 1, 2, 3 ... K−1, are simultaneously loaded into bins 2, 3, 4 ... K respectively.

During the subsequent first time interval of the current cycle, switch means 60 reverts to the setting shown in FIG. 1. The accumulator circuit is again formed and bin 0 accumulates the aforesaid second group of $N_L$ echo contributions, the first echo contribution of the latter group having been loaded in during the preceding second time interval. Simultaneously, each of switch means 70 reverts to the setting shown in FIG. 1, in which the output of each bin is connected to its input. Thus, the contents of bin 1, specifically the first group of $N_L$ lumped echo contributions, will recirculate around bin 1 for the duration of the current first time interval. This is likewise true for the contents, if any, of bins 2, 3 ... K.

At the conclusion of the current cycle, bin 0 stores the second group of $N_L$ echo contributions in lumped form. During the subsequent second time interval, which starts the next cycle, the first group of echo contributions is shifted from bin 1 into bin 2. Bin 1 receives the aforesaid second group from bin 0 and the first echo contribution of a third group of $N_L$ echo contributions is loaded into bin 0.

The above-described process iss carried out repetitively. Bin 0 accumulates successive groups of $N_L$ lumped echo contributions during each cycle, while each of the remaining bins of the sequence receives the contents of the preceding bin during the second time interval of the subsequent cycle. When each one of the $N_B$ bins in the bin sequence stores the accumulated contents of one group of $N_L$ echo contributions, a complete sector echo is present in the bin sequence. Since the application of data signals to input terminal 52 is a continuous process, it will be understood that the bin sequence normally stores $N_B$ groups of $N_L$ lumped echo contributions, which are shifted along the bin sequence at cycle intervals.

Regardless of the setting of switch means 60 and 70 during the above-described operation, bin outputs $62_0$, $62_1$ ... $62_K$ remain connected throughout to the inputs of the corresponding numeric adders $72_0$, $72_1$, ... $72_K$. Thus, during the first time interval of each cycle, each of bin outputs $62_1$, $62_2$ ... $62_K$ provides signals representative of $N_L$ lumped echo contributions. The signals at bin output $62_0$, however, represent the instantaneous status of the accumulation process. Only during the second time interval of each cycle will all bin output signals represent $N_L$ lumped echo contributions. However, notwithstanding the instantaneous status of the accumulation process in bin 0, a constant-value, externally derived weighting signal $WS_0$ is applied to numeric adder $72_0$ throughout successive cycles. Likewise, a separate, constant-value weighting signal is applied throughout successive cycles to each of numeric adders $72_1$, $72_2$ ... $72_K$.

Let it be again assumed that $N_L = 10$ and that during the first time interval of a particular cycle bin 0 has accumulated the first group of echo contributions, i.e. echo contributions 1-10 of the echo which corresponds to a particular sector. During the following second time interval of the next cycle, these signals appear at bin output $62_0$ from where they are further applied to numeric adder $72_0$, (as well as being shifted to bin 1). The constant-value correction applied by externally provided weighting signal $WS_0$ corrects the contents of bin 0 for echo intensity variations produced by the beam gain profile, as it exists at the leading edge of the scanning beam. While each of the lumped echo contributions of the aforesaid first group is affected somewhat differently by the beam gain profile, weighting signal $WS_0$ provides an average correction for the entire first group of lumped echo contributions 1-10.

During the next cycle, signals representative of the second group of echo contributions, i.e. echo contributions 11-20, accumulate in bin 0 and appear at bin output $62_0$ for application to numeric adder $72_0$. During the second time interval of the current cycle, all of the echo contributions of the second group are present in lumped form at bin output $62_0$. Simultaneously, the first group of echo contributions appears at bin output $62_1$, for application to numeric adder $72_1$. The average correction applied by constant-value weighting signal $WS_1$, which is likewise provided from an external source, is less than that provided by $WS_0$, since the beam gain closer to the sweep line is higher and requires a smaller signal correction. This process corresponds to the actual physical conditions. Specifically, the sweep line is closer during the second sweep to the group of subsectors responsible for echo contributions 1-10, than was the case during the first sweep and hence the signal will be larger. However, the correction that was applied to the first group by signal $WS_0$, is now applied to the second group of lumped echo contributions, i.e. to echo contributions 11-20 which reside in bin 0.

As the first group of echo contributions is shifted down the bin sequence, the correction applied by the weighting signals decreases. Zero correction is applied to the contents of the middle bin of the sequence, since the beam gain is unity at the sweep line. Subsequent corrections applied to the first group again increase in magnitude, terminating with signal $WS_K$. The latter signal applies a correction substantially identical to $WS_0$, provided the beam gain profile is symmetrical with respect to the sweep line. The process described above applies identically to subsequent groups of lumped echo cntributions, as they are shifted from bin 0 to bin K.

To summarize the operation of the portion of the circuit of FIG. 1 discussed so far, a group of $N_L$ lumped echo contributions is accumulated in bin 0 during each cycle. Each such group is shifted along successive bins of the bin sequence during successive cycles. A separate, constant-value correction factor is applied to the contents of each bin appearing at output terminal 62. Thus, each group of lumped echo contributions, as it shifts down the bin sequence, has a different correction factor applied thereto at each stage.

Figure 5:
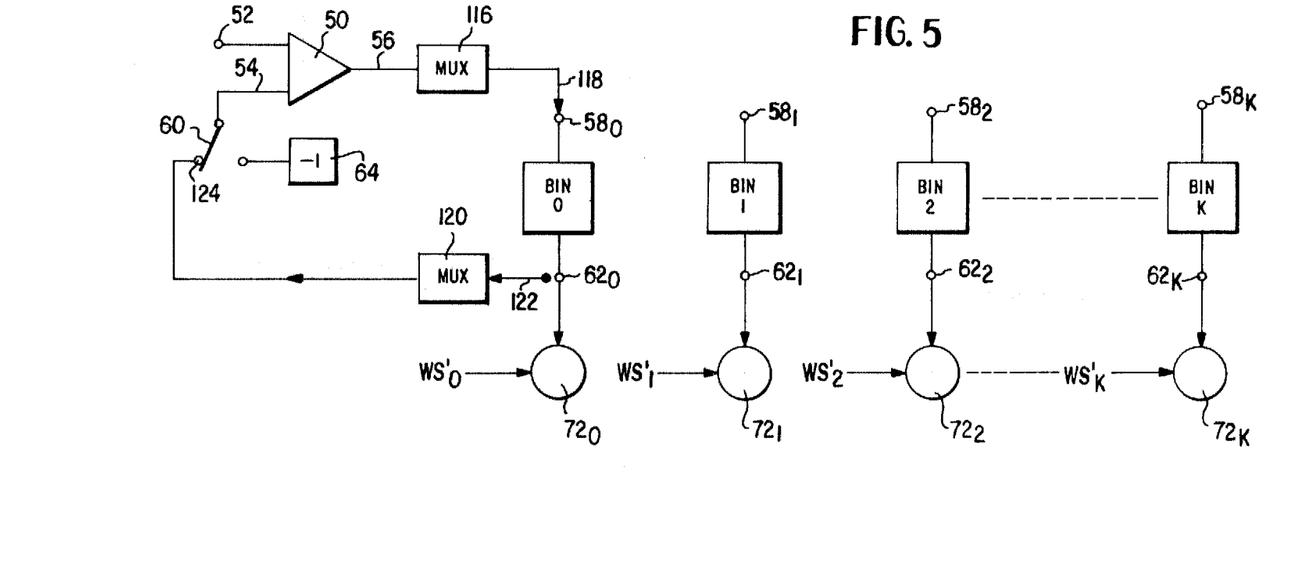
FIG. 5 schematically illustrates on alternative embodiment of the invention, as applied to a portion of the circuit of FIG. 1.

The timing requirements of the foregoing operation may be simplified by using a different approach, as schematically illustrated in an alternative embodiment of the invention, shown in FIG. 5. Wherever applicable, reference numerals from FIG. 1 have been carried forward to FIG. 5. As shown in the drawing, output 56 of power adder 50 is coupled to a multiplexer 116, whose output is schematically indicated at 118. A terminal 124 of switch means 60 is connected to a further multiplexer 120, whose input is schematically indicated at 122.

In operation, multiplexer output 118 is successively coupled to respective inputs 58 of the bin sequence. Specifically, output 118 is connected to input $58_0$ of bin 0 for a full first cycle. Thereafter, output 118 switches to bin input $58_1$ where again it remains connected for a full second cycle. The process continues through bin input $58_K$, after which it repeats by again being connected to input $58_0$. Similarly, multiplexer input 122 is connected in succession to bin outputs $62_0$, $62_1$ ... $62_K$ respectively for a full cycle each, after which the process again repeats with bin output $62_0$.

When multiplexer output 118 and multiplexer input 122 are connected to bin input $58_0$ and bin output $62_0$ respectively, power adder 50 and bin 0 form an accumulator circuit in the manner discussed above in connection with the operation of FIG. 1. During the cycle in which this connection is maintained, the echo contributions loaded into bin 0 by way of input 54, power adder 50 and multiplexer 116, accumulate until the first group of $N_L$ lumped echo contributions is stored in bin 0 and becomes available on bin output $62_0$. Similarly, during the next cycle an accumulator circuit is formed by power adder 50 and bin 1, such that the second group of $N_L$ lumped echo contributions is accumulated in bin 1. The process continues until, after a period of $N_B$ cycles has elapsed, all bins of the sequence contain a group of $N_L$ lumped echo contributions. At such time, a complete sector echo is represented by the joint contents of the bins.

Since the process is continuous, subsequent groups of $N_L$ lumped echo contributions will be loaded into the respective bins during successive cycles, in correspondence with the actual physical conditions as the radar beam scans through its azimuth angle. During each period lasting $N_B$ cycles, each bin, except the one which then forms part of the accumulator circuit, will provide data signals at bin output 62 representative of $N_L$ stored echo contributions. At the output of the accumulating bin, however, the signal provided will represent the instantaneous status of the accumulation process.

It will be clear that the weighting signal applied to a particular numeric adder 72 and designated WS' in FIG. 5, must be maintained constant during each cycle. This is required by the fact that the weighting signal applies a correction during the cycle which is averaged for $N_L$ echo contributions. The correction applies to a particular positional relationship of the radar beam to the $N_L$ subsectors from which the lumped echo contribution is derived. During the following cycle, the positional relationship of the beam to these same $N_L$ subsectors is different and will require a weighting signal having a different value. This is true for all of the separate weighting signals, each of which must periodically change values in $N_B$ steps. Specifically, if $N_B=16$, the externally provided weighting signal $WS_0'$ is different during each of 16 cycles in order to apply the correction factor appropriate to the group of lumped echo contributions appearing at output terminal $62_0$ during each cycle. Similarly, weighting signals $WS_1'$, $WS_2'$, ... $WS_K'$ must change values each cycle, in synchronism with each other and with $WS_0'$.

Although the process by which the weighting signals are applied differs from that explained in connection with FIG. 1, the output signals applied by numeric adders $72_0$, $72_1$, $72_2$ ... $72_K$ respectively, to adder tree 74 are identical in content and timing for both situations. Accordingly, the operation of the adder tree applies to either FIG. 1 or FIG. 5. The adder tree performs a beam width integration process which will be self-evident from the drawings and from the previous discussion of this circuit. The weighted output signals provided by successive pairs of numeric adders are each applied to one power adder in the first level of the adder tree, such as units 76, 78 ... 90. Subsequent pairing of the signals so obtained is performed in subsequent levels of the adder tree until a beam width integrated output signal is obtained at output 105, representative of a complete echo. It will be understood that the sector echo represented by the beam width integrated output signal is different for each sweep due to the angular advance of the beam between successive sweeps. For a particular scan direction of the beam, e.g. a clockwise scan, the difference for each sweep is due to the addition of a subsector at the leading beam edge and the subtraction of a subsector at the lagging beam edge.

The invention herein achieves a significant reduction in the amount of special purpose equipment required and hence a reduction in the overall cost and complexity of implementing a horizontal beam width integrator of the type under discussion here. Alternatives to the two embodiments described hereinabove will be readily apparent to those skilled in the art. It has already been noted that the switch means as well as the storage bins may be implemented in a number of different ways. Further, the scanned azimuth angle may be less than 360°, which will affect the timing of the overall operation.

The bins themselves may have different storage capacities to accommodate a wide variety of radar systems having different maximum beam ranges, or having different numbers of discrete range zones. Likewise, the data signals may represent different word sizes, e.g. 9 bit or 10 bit words, depending solely on the precision with which the respective echo intensities are to be described. It is also possible to vary $N_L$, the number of lumped echo contributions per group. Such variation may be upward or downward, depending on the desired tradeoffs between the amount of required hardware and the accuracy and realism in the final representation of the radar image. The realism of the image may be further enhanced by using additional digits to provide improved accuracy of the power adders. Up to the full number of digits may be used to represent the difference signal Δ. For example, when $N_w=8$, signal Δ may have up to eight digits. Under these conditions, table lookup 110 must be adapted accordingly.

From the foregoing discussion of a preferred embodiment of the invention, it will be clear that numerous modifications, variations, substitutions and alternatives will now occur to those skilled in the art, all of which fall within the spirit and scope of the invention described and illustrated herein. Accordingly, it is intended that the invention be limited only by the scope of the claims appended hereto.

What is claimed is:

1. Apparatus for integrating externally stored data signals adapted to simulate echoes produced by successive radial sweeps of a radar beam while traversing a predetermined azimuth angle, respective portions of the total area illuminated by said beam during each sweep providing contributions to the echo from said area, each of said echo contributions varying for successive sweeps as a function respectively of the beam gain profile and of the beam position relative to the corresponding area portion, respective ones of said echo contributions being simulated as a plurality of said data signals in digital, logarithmic form each representative of the echo intensity at a discrete beam range of the corresponding illuminated area portion;

said apparatus comprising:

means for successively receiving said simulated data signals from external storage;

means for accumulating said received data signals during periodically repeating cycles, said accumulating means providing a lumped data signal in logarithmic form for each discrete beam range, the lumped data signals accumulated upon completion of each of said cycles being jointly representative of a group of lumped echo contributions, the number of echo contributions in said group being determined substantially by the duration of each cycle as a selected multiple of the sweep period;

a plurality of storage bins jointly capable of storing the data signals of a complete echo;

means for loading successive ones of said groups of lumped echo contributions into separate ones of said bins during successive cycles;

means for applying a weighting factor to said groups of lumped echo contributions in said bins to correct for variations due to said beam gain profile, each of said last-recited means including separate means connected to each bin for numerically adding a separate, externally derived, average weighting signal to each of the lumped data signals received from the connected bin; and means for combining the gain profile-corrected groups of lumped echo contributions by successive pairing;

whereby digital output signals in logarithmic form are provided at the output of said combining means which simulate the echo produced by each sweep of said beam.

2. Apparatus in accordance with claim 1 wherein each of said average weighting signals has a constant value during successive cycles;

said accumulating means including a first one of said plurality of bins adapted to store said group of lumped echo contributions accumulated during a first time interval in each cycle;

said loading means including means for connecting said plurality of bins into a bin sequence during a second time interval of each cycle, said connecting means enabling the successive shifting of each of said stored groups of lumped echo contributions from said first bin along said bin sequence during said successive cycles.

3. Apparatus in accordance with claim 2 wherein said combining means comprises a plurality of substantially identical power adders each including a pair of inputs and an output, each of said power adders being adapted to provide a digital output signal at its output representative of the logarithm of the numeric sum of a pair of digital, logarithmic input signals applied to said pair of inputs; and wherein said power adders are connected to form an adder tree comprising successive levels of decreasing numbers of units, each power adder of the first level of said adder tree having its pair of inputs connected to a separate pair of said numeric adding means, said adder tree terminating in a single power adder adapted to provide said output signals.

4. Apparatus in accordance with claim 3 wherein each of said bins includes an input and an output, each of said last recited outputs being coupled to a corresponding one of said numeric adding means;

a further power adder substantially identical to each of said plurality of power adders;

one input of said further power adder being coupled to said receiving means;

the output of said further power adder being coupled to the input of said first bin;

first switch means coupled to the other input of said further power adder;

said first switch means being adapted to connect said further power adder input to the output of said first bin during said first time interval to form said accumulating means, said first switch means being further adapted to connect said last-recited power adder input to a zero input source during said second time interval to terminate the accumulation function without interrupting the application of said simulated data signals to said one power adder input.

5. Apparatus in accordance with claim 4 wherein said connecting means includes separate second switch means coupled to the input of each remaining one of said plurality of bins following said first bin, said second switch means being adapted to couple the input of each of said remaining bins to its own output during each of said first time intervals and to the output of the preceding bin of said sequence during each of said second time intervals respectively.

6. Apparatus in accordance with claim 5 wherein each of said bins comprises a shift register responsive to the application of clock pulses to shift the data signals stored therein, said clock pulses being adapted to circulate said last-recited signals around the corresponding shift register during said first time interval.

7. Apparatus in accordance with claim 4 wherein each of said power adders comprises:

means for generating a digital difference signal by subtracting the signal received in digital logarithmic form on one of said pair of inputs from that received on the other thereof, including means for identifying the larger and the smaller one respectively of said received signals;

table look-up means responsive to said difference signal to provide a corresponding digital correction signal;

means for bringing said larger signal and said correction signal into phase with each other; and numeric summing means responsive to said phased signals to provide a digital signal at the output of said power adder representative of the logarithm of the numeric sum of the signals received at said pair of power adder inputs.

8. Apparatus in accordance with claim 7 wherein said means for generating a digital difference signal comprises means for subtracting the signal on one of said pair of inputs from the other thereof to provide a difference signal which is limited to fewer bits than the input signals thereto.

9. Apparatus in accordance with claim 1 wherein the value assumed by each of said average weighting signals is different during respective ones of a predetermined number of successive cycles;

each of said bins including an input and an output;
a first power adder including a first input coupled to said receiving means, a second input and an output, said first power adder being adapted to provide a digital output signal at its output representative of the logarithm of the numeric sum of digital, logarithmic signals applied to said first and second power adder inputs;
said loading means including means for coupling said output and said second input of said first power adder to the bin input and the bin output respectively of a separate one of said plurality of bins during each cycle, said coupling means being effective to couple said first power adder in succession to each of said bins during said predetermined number of successive cycles;
whereby said accumulating means comprises a different bin in each cycle in combination with said first power adder.

10. Apparatus in accordance with claim 9 wherein said combining means comprises a plurality of power adders substantially identical to said first power adder, said plurality of power adders being connected to form an adder tree comprising successive levels of decreasing numbers of units, each power adder of the first level of said adder tree having its pair of inputs connected to a separate pair of said numeric adding means, said adder tree terminating in a single power adder adapted to provide said output signals.

11. Apparatus in accordance with claim 10 wherein each of said power adders comprises:

means for generating a digital difference signal by subtracting one of the signals received in logarithmic digital form on said first and second inputs from the other of such received signals, including means for identifying the larger and the smaller one respectively of said received signals;
table look-up means responsive to said difference signal to provide a corresponding digital correction signal;
means for bringing said larger signal and said correction signal into phase with each other; and
numeric summing means responsive to said phased signals to provide a digital signal at the output of said power adder representative of the logarithm of the numeric sum of the signals received at said power adder inputs.

12. Apparatus in accordance with claim 11 wherein said means for generating a digital difference signal comprises means for subtracting the signal on one of said pair of inputs from the other thereof to provide a difference signal which is limited to fewer bits than the input signals thereto.

13. Apparatus in accordance with claim 12 wherein each of said bins comprises a shift register responsive to the application of clock pulses to shift the data signals stored therein between said input and said output of said bin.

14. Apparatus for integrating externally stored data signals adapted to simulate echoes produced by successive radial sweeps of a radar beam while traversing a predetermined azimuth angle, respective portions of the total area providing contributions to the echo from said area, said echo contributions varying for successive sweeps as a function respectively of the beam gain profile and of the beam position relative to the corresponding area portion, respective ones of said echo contributions being simulated as a plurality of said data signals in digital, logarithmic form, each representative of the echo intensity at a discrete beam range of the corresponding illuminated area portion;

said apparatus comprising:
a plurality of power adders each including a pair of inputs and an output, each power adder being adapted to provide a digital output signal representative of the logarithm of the numeric sum of a pair of digital, logarithmic input signals applied to said pair of inputs;
means for successively applying said simulated, digital data signals from external storage to one input of a first one of said power adders;
a sequence of storage bins each including an input and an output, each of said bins being capable of storing said plurality of data signals representative of a simulated echo contribution;
the input of a first one of said sequence of bins being coupled to the output of said first power adder;
first switch means adapted to assume first and second settings during first and second time intervals respectively of a periodically repeating cycle, the period of said cycles being a selected multiple of the sweep period;
said first switch setting coupling the other input of said first power adder to the output of said first bin to form an accumulator circuit adapted to accumulate said simulated data signals applied to said first power adder, said second switch setting coupling said other power adder input to a zero input source to terminate the accumulating action without interrupting the application of said simulated data signals to said first power adder;
said accumulating action being effective to store a lumped data signal in logarithmic form in said first bin for each discrete beam range, the lumped data signals accumulated upon completion of each of said cycles being jointly representative of a group of lumped echo contributions, the number of echo contributions in said group being determined by the duration of said first time interval;
separate second switch means connected to the input of each remaining bin of said sequence following said first bin, each of said second switch means being adapted to couple the connected bin input to the output of the same bin during each of said first time intervals and to the output of the preceding bin of said sequence during each of said second time intervals respectively, the duration of each of said second time intervals being chosen to effect the transfer of a single one of said groups between successive bins, whereby successive ones of said groups are shifted along said bin sequence during successive second time intervals;

said bin sequence being capable of storing a complete echo when all bins are full;

a separate numeric adder connected to the output of echo of said bins;

means for applying a separate, externally derived, constant value weighting signal to each of said numeric adders, each of said weighting signals being adapted to apply a constant average correction for gain profile-originated variations of the echo intensities of the group of lumped echo contributions provided at the connected bin output; and means including the remaining ones of said plurality of power adders for numerically combining the gain profile-corrected signals at the outputs of said numeric adders by successive pairing;

whereby digital output signals in logarithmic form are provided at the output of said combining means which simulate the echo produced by each sweep of said beam.

15. Apparatus in accordance with claim 14 wherein said remaining power adders are connected to form an adder tree comprising successive levels of decreasing number of units, each power adder of the first level of said adder tree having its pair of inputs connected to a separate pair of said numeric adders, said adder tree terminating in a single power adder adapted to provide said output signals.

16. Apparatus in accordance with claim 15 wherein each of said power adders comprises:
means for generating a digital difference signal by subtracting one of the signals received in logarithmic digital form on said pair of inputs from the other thereof, including means for identifying the larger and the smaller one respectively of said received signals;

table look-up means responsive to said difference signal to provide a corresponding digital correction signal;

means for bringing said larger signal into phase with said correction signal; and numeric summing means responsive to said larger signal and said correction signal in phase with each other to provide a digital signal at the output of said power adder representative of the logarithm of the numeric sum of the signals received at said pair of power adder inputs.

17. Apparatus in accordance with claim 16 wherein said means for generating a digital difference signal comprises means for subtracting the signal on one of said pair of inputs from the other thereof to provide a difference signal which is limited to fewer bits than the input signals thereto.

18. Apparatus in accordance with claim 14 wherein each of said bins comprises a shift register responsive to the application of clock pulses to shift the simulated data signals stored therein, said clock pulses being adapted to circulate said last-recited signals around the corresponding shift register during said first time interval.

19. In a system for providing a synthetic radar image of the space defined by a predetermined azimuth angle by generating radar target echoes from externally stored data, said generated echoes simulating actual echoes produced at a predetermined pulse repetition frequency by successive radial sweeps of a radar beam while said beam traverses said azimuth angle, said sweeps covering successive, partially overlapping areas of said azimuth angle each approximating the shape of a sector defined substantially by the beam width and by the maximum beam range, the angular advance by said beam between successive sweeps defining $N_S$ subsectors per beam sector each adapted to provide a contribution to the echo from the sector illuminated by said beam, the beam gain profile across said beam width being effective to vary the intensity of the echo contributions provided by a given subsector in accordance with the position of said beam relative to said subsector during successive sweeps, each of said echo contributions being simulated in said externally stored data as $N_R$ multi-digit data signals, each of said data signals representing in digital, logarithmic form the echo intensity at one of $N_R$ discrete beam ranges;

a beam with integrator comprising: a plurality of power adders each including a pair of inputs and an output, each power adder being adapted to provide a digital output signal representative of the logarithm of the numeric sum of a pair of digital, logarithmic input signals applied to said inputs;

means for successively applying said data signals from external storage in clock pulse synchronism to one input of a first one of said power adders;

a sequence of $N_B$ storage bins each capable of storing one of said simulated echo contributions, each of said bins being responsive to the application of clock pulses to shift respective ones of said multi-digit data signals stepwise from the input to the output of said bin with $N_R$ clock pulses;

the input of a first bin of said sequence being coupled to the output of said first power adder;

first switch means adapted to assume first and second switch settings during first and second time intervals respectively of a periodically repeating cycle having a duration of $N_R \times N_L$ clock pulses, said first and second time intervals having a duration of $N_R (N_L - 1)$ clock pulses and $N_R$ clock pulses respectively.

where $N_L = N_S/N_B$, and $N_B$, $N_L$, $N_R$ and $N_S$ are positive integers;

said first switch setting coupling the other input of said first power adder to the output of said first bin to form an accumulator circuit adapted to accumulate said data signals applied to said first power adder, said second switch setting coupling said other power adder input to a zero input source to terminate the accumulating action without interrupting the application of said data signals to said first power adder;

said accumulating action being effective to store a lumped data signal in logarithmic form in said first bin for each discrete beam range, the lumped data signals accumulated upon completion of each of said cycles being jointly representative of a group of $N_L$ lumped echo contributions;

separate second switch means connected to the input of each remaining bin of said sequence following said first bin, each of said second switch means being adapted to couple the connected bin input to the output of the same bin during each of said first time intervals and to the output of the preceding bin in said sequence during each of said second time intervals respectively, whereby successive groups of $N_L$ lumped echo contributions are shifted along said bin sequence during successive second time intervals;

said bin sequence being capable of storing a complete sector echo when all bins are full;

a separate numeric adder connected to the output of each of said bins;

means for applying a separate, externally derived weighting signal of constant value to each of said numeric adders, each of said weighting signals being adapted to apply a constant average correction for gain profile-originated echo intensity variations of the group of lumped echo contributions provided at the connected bin output;

an adder tree formed by the remaining ones of said plurality of power adders arranged in successive levels of decreasing numbers of units, each power adder in the first one of said levels having its pair of inputs coupled to the outputs of a separate pair of said numeric adders, said adder tree terminating in a single power adder adapted to provide digital output signals in logarithmic form which simulate the echo produced by each sweep of said beam.

20. Apparatus in accordance with claim 19 wherein each of said power adders comprises:

means for generating a digital difference signal by subtracting one of the signals received in logarithmic digital form on said pair of inputs from the other of such received signals, including means for identifying the larger and the smaller one respectively of said received signals;

table look-up means responsive to said difference signal to provide a corresponding digital correction signal;

buffer means adapted to delay said larger signal sufficiently to place it in phase with said correction signal; and numeric summing means responsive to said delayed larger signal and said correction signal to provide a digital signal at the output of said power adder representative of the logarithm of the numeric sum of the signals received at said pair of power adder inputs.

21. Apparatus in accordance with claim 20 wherein said means for generating a digital difference signal comprises means for subtracting the signal on one of said pair of inputs from the other thereof to provide a difference signal which is limited to fewer bits than the input signals thereto.

22. Apparatus in accordance with claim 21 wherein:
$N_B = 16$;
$N_L = 10$;
$N_S = 160$; and
$N_R \geq 1000$.

23. Apparatus for integrating successively received digital data signals representative of information values acquired in sequence in successive sets of equal magnitude, said data signals being organized into successive signal sets corresponding to said sets of information values and requiring progressively varying corrections for externally caused signal amplitude distortions of the true representation of said information values;

means cyclically operative for accumulating a predetermined number of said data signal sets during each cycle, each accumulation being adapted to provide a corresponding single set of lumped data signals;

means for applying a separate weighting factor to each of said sets of lumped data signals, each of said weighting factors being adapted to correct for the average distortion experienced by the respective data signal sets which combine to form each set of lumped data signals; and means operative by successive signal pairing for combining a plurality of weight-corrected sets of said lumped data signals, said combining means being adapted to provide a single set of integrated output signals representative of a body of information defined by said information values.

24. Apparatus in accordance with claim 23 wherein each of said digital data signals represents a corresponding information value in logarithmic form; and said means for applying separate weighting factors comprise means for numerically adding a separate, digital weighting signal in logarithmic form to each signal of a set of lumped data signals.

25. Apparatus in accordance with claim 24 and further comprising:

a sequence of storage bins each adapted to store a single set of said data signals;

means for storing successive sets of said lumped data signals in a first bin of said sequence during successive cycles;

means for shifting said sets of lumped data signals in succession from said first bin along said bin sequence during said successive cycles;

a separate one of said numeric adding means being connected to the output of each of said bins, each of said separate weighting signals being applied to one of said separate numeric adding means and having a constant value throughout; and said combining means being coupled to the outputs of said separate numeric adding means.

26. Apparatus in accordance with claim 24 and further comprising:

a plurality of storage bins each adapted to store a single set of said data signals;

means for loading successive sets of said lumped data signals into separate ones of said plurality of bins during successive cycles of a periodically repeating predetermined number of said cycles;

a separate one of said numeric adding means being connected to the output of each of said bins, each of said separate weighting signals being applied to one of said separate numeric adding means and assuming different values during said successive cycles; and said combining means being coupled to the outputs of said separate numeric adding means.

* * * * *